Nov. 19, 1940.                M. B. BELINE                2,222,166
                                ORDER DIAL
                          Filed Dec. 24, 1938           3 Sheets-Sheet 1

INVENTOR.
Martin B. Beline
BY
Ostrolenk & Greene
ATTORNEYS

Nov. 19, 1940.   M. B. BELINE   2,222,166
ORDER DIAL
Filed Dec. 24, 1938   3 Sheets-Sheet 2

INVENTOR.
Martin B. Beline
BY
Ostrolenk & Greene
ATTORNEYS

Patented Nov. 19, 1940

2,222,166

UNITED STATES PATENT OFFICE 2,222,166

ORDER DIAL

Martin B. Beline, New York, N. Y.

Application December 24, 1938, Serial No. 247,553

8 Claims. (Cl. 116—135)

This invention relates to an ordering device and more specifically to an order dial or a means which is particularly useful in connection with the ordering of milk or dairy products.

In most communities it is customary for a milkman to deliver milk, cream and other dairy products at early hours in the morning to a series of retail purchasers. Such milk and dairy products are left at the door long before these retail purchasers have arisen.

The milkman customarily has a standing order of so many quarts of milk a day and so many other quantities of dairy products as the housewife or the person running the household may deem necessary. Where the housewife requires a change in that order and particularly where she requires anything additional, it is necessary to follow various different procedures.

Thus, she may, after the order has been delivered, order such additional quantities as may be deemed needed from the retail establishment in the immediate neighborhood. This is usually necessary since it is inconvenient to speak directly to the milkman. Accordingly since such extra supplies are, when required, often ordered from the local retail establishment, the milk delivery company and the specific milkman on the route lose whatever additional business might have been obtained had a convenient method of ordering additional supplies been furnished to the housewife in advance.

Frequently, however, the person requiring additional supplies of dairy products will write a note and insert said note in the top of an empty milk bottle so that when the milkman collects such empty bottles he will be able to fill any additional requirements that may be needed. This is inconvenient since it requires that the housewife must herself find paper and pencil, write out her requirements, then find an empty milk bottle, place the note in the bottle, make sure that it is not inserted so far that it will fall in and be unnoticeable and at the same time make sure that it is inserted far enough so that it will not fall out or be blown away. She then places the empty bottle with the note contained therein in the customary place for collection by the milkman, in the hope that the note will remain in place, that the milkman will notice it, and that he will be able to decipher it.

These difficulties become even greater in households where food supplies are under control of or ordered by persons who might be otherwise efficient in their duties but unable to express themselves or unable to write clearly.

Accordingly, milk companies may obviate many of the difficulties herein described by supplying their customers with a convenient and useful means which will facilitate the ordering of milk and dairy products, which at all times will be simple to use, clear to understand, and impossible to overlook.

The objects of this invention therefore are to provide an order dial or ordering means which will enable a customer to indicate simply what products or additional products such customer may desire and which will indicate the quantities and grades of such products.

A further important element lies in the fact that very often a customer does not know the products which are dealt in (handled or carried) by the company furnishing the milk and cream. The customer may not realize that she may obtain products other than milk or cream, such as for instance eggs, drinks of various kinds, butter or cheese from that same company.

Further objects of this invention therefore are so to arrange such order dial or ordering device that the customer, while attempting to determine what quantities of regularly ordered goods she needs, cannot escape noticing the various types of additional products sold by the particular company.

The use of such an order dial or ordering device by the customer thus makes it easier for her to order any products which she may require, makes its easier for the milkman to determine what additional requirements may be needed; and the furnishing of such an ordering device to the customer by the milk company is definitely an aid in building good will, particularly where the ordering device is personalized by the insertion of the name of the customer on said device. There is a definite advertising value in the fact the name of the company is repetitiously brought to the attention of the customer.

The utility of the order dial or device may be increased by so forming said device that it may be used not only in connection with a milk bottle but may also be fitted over a door knob, a nail or hook or any other retaining member.

In the construction of my invention and in the following description thereof, I have not been unaware of certain devices of this general class which have heretofore been disclosed in the prior art. These are represented by (1) the patent to Merrel 1,695,325 in which a stiff card having an opening therein is adapted to be mounted over the neck of a milk bottle, the opening being smaller than the lip of the milk bottle, a slot assisting in the mounting of the card. This card also contains spaces in which additional orders may be written. (2) The patent to Kelly 1,617,850 in which a card having various spaces in which information may be written is adapted to be either mounted over the neck of a milk bottle or inserted in the top thereof. In all of these devices it is necessary for the user to write out the articles desired and the quantity thereof and further in all of these devices the order card itself is not reusable. I am also aware of other indicating devices adapted for use in connection with milk bottles or which are to be used for ordering of various household items. These devices however provide complicated indicator means which are expensive in manufacture and difficult in use. Representative of such are (3) the patent to Conover 1,864,416 or the (4) patent to Simeone 2,024,889 which provide for indicator means to be inserted on the lid or in the bottle opening as a closure for the bottle. These devices have failed to gain commercial acceptance because they depend on dial mans which might easily be accidentally moved from their desired predetermined position and because of the fact that they must be used in connection with the bottle closure.

Nor have I overlooked members of the type shown in the patents to (5) Chenault 1,990,317 and (6) Rose 1,892,163 in which again the indicator means disclosed must be inserted in the open top of the milk bottle and wherein the indicator consists of movable or slidable members which might easily be displaced. Included in suggested devices is the patent to (7) Hooge 1,951,611 which depends upon a complicated series of signalling systems which could be easily displaced and which is obviously expensive to manufacture and the (8) patent to Wehner 764,648 in which a series of sliding indicators are moved back and forth along a series of strings.

My invention by its very simplicity as herein disclosed provides an indicating device which is extremely simple to use, inexpensive to manufacture and is constantly and continually reusable. The particular conformation of various preferred forms of my ordering dial will be clear from the following specification and drawings in which.

Figure 1:
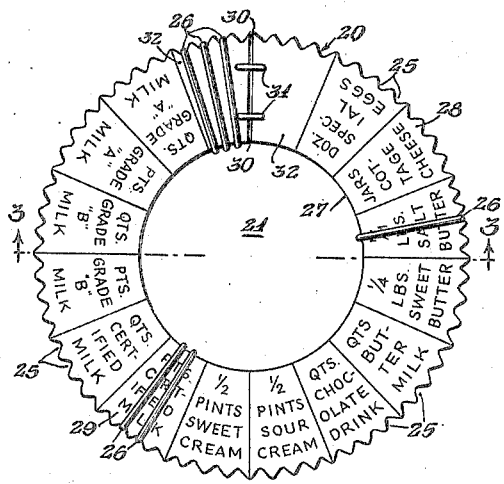
Figure 1 is a top view of one face of my improved order dial.
Figure 3:
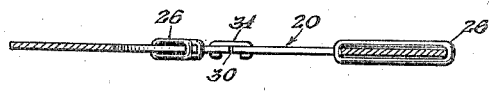
Figure 3 is a cross-sectional elevation taken on the line 3—3 of Figure 1 looking in the direction of the arrows.
Figure 4:
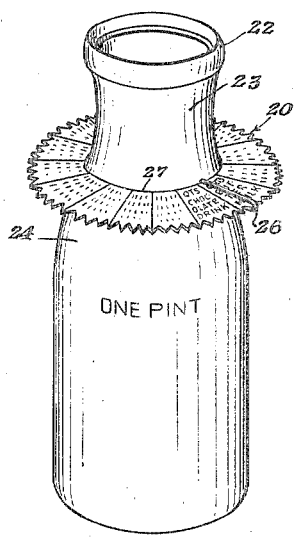
Figure 4 is a perspective view showing my device in use in connection with a milk bottle; also showing that said device may be used on a small size bottle as well as on the quart size.

Referring now to Figures 1, 3 and 4, I have here shown a simplified order dial or ordering device of my invention which is easy to use, inexpensive to manufacture and which enables the user to readily indicate what items and what quantities of items the user may require. The main or body portion of the dial 20 comprises a stiff disk preferably made of Celluloid or similar material, said disk having a hole 21 of such size that it will fit over the top 22 of a milk bottle, resting on the neck 23 thereof but nevertheless being smaller in diameter than the main body portion 24 of the milk bottle so that the order dial or ordering device will come to rest securely in approximately the position shown in Figure 4, where I have shown it in connection with a pint size bottle.

In the preferred form, as shown in Figure 1, the outer periphery of the order dial may bear a series of notches 25. Bands of rubber or other elastic material 26 may be mounted on the order dial as shown in Figures 1 and 3. These bands may be freely slidable to any desired position on the order dial. The elastic bands 26 may be so dimensioned that in their unstretched position they are slightly shorter than the distance from the inner edge 27 of the order dial to the notches 25 on the outer periphery thereof. Thus, when they are mounted on the order dial, they are, in the preferred form, stretched to a slight extent.

Therefore, when the rubber bands 26 are moved to any desired position on the order dial, so that one end thereof rests in a notch 25, they cannot be unintentionally or accidentally moved from such position.

The face of the order dial may be marked off as indicated in Figure 1 to show various types of items which may be ordered. Accordingly, the placement of a rubber band at, for instance, the area 26 of Figure 1 would indicate that a quarter pound of salt butter was required. Where the number of items which are dealt in by the milk delivery company is so small that there may be a separate space for each anticipated quantity of each item, then it is necessary for the user merely to move a rubber band to a space denoting the particular quantity of the particular item desired. Where, however, as is usually the case, the milk delivery company deals in or distributes a relatively large number of different items, then an attempt to provide space on the order dial for different quantities of the different items would so crowd the order dial as to impair its usefulness.

My invention, however, provides an easy solution for this problem in that the particular quantity of each item specified on the order dial is the smallest quantity of that item which is customarily ordered. In the event that the customer should require any multiple quantity, then it would be necessary for her merely to place a plurality of rubber bands over the space for that item rather than one rubber band. Thus, for instance, as shown at 29, of Figure 1, the placement of two rubber bands at that area indicates that two pint bottles of certified milk are desired.

Owing to the fact that in the preferred embodiment, rubber bands are used as indicators, the order dial or disk is cut or slotted at 30, Figure 1, staples 31—31 being provided in order to join the ends together. Such cut 30 is necessary in order to mount the rubber bands upon the dial.

It may also be noted that a blank space 32 may be provided on the order dial so that any rubber bands which are not being used to indicate a particular order desired, may be placed thereon in order to avoid confusion. In the use of my order dial, arbitrary values or meanings may be given to the various placements of the indicators or rubber bands; thus, in the use of my order dial, the placement of all the indicator or rubber bands in the blank space 32 may serve to inform the milk delivery man that no delivery of any order at all is desired on that particular day.

Figure 11:
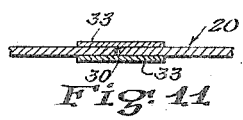
Figure 11 is a cross sectional view corresponding to the center portion of Figure 3 and showing an alternative means for fastening the ends of the material forming my order dial together.

It is, of course, obvious as seen in Figure 11, that any other suitable means besides the staples 31 may be used to join the ends of the material forming the order dial at 30. Thus, for instance, patches 33—33, Figure 11 may be adhesively mounted over the cut or slot 30, engaging adjacent portions of the order dial and binding them together.

Figure 2:
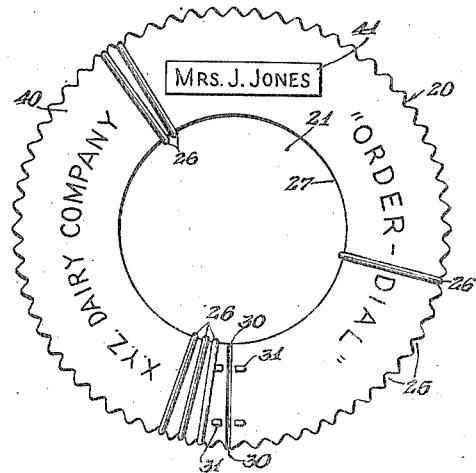
Figure 2 is a plan view of the opposite side of said order dial.

In the form thus shown in Figures 1, 2 and 11 for binding together the ends of the material forming the order dial at 30, it would be difficult to replace on the order dial any rubber bands which may have been broken. Thus, when a few of the rubber bands have been destroyed in use, it may be necessary to either supply a new order dial or to break the staples or adhesive patch, mount additional rubber bands thereon and then refasten the ends of the material forming the order dial.

Figure 12:
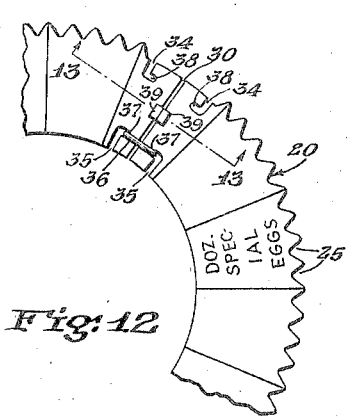
Figure 12 is a top plan view corresponding to a portion of Figure 1 showing a further modified means of fastening the ends of the material forming my order dial together.
Figure 13:
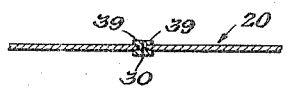
Figure 13 is a cross-section on the line 13—13 of Figure 12.

Since the order dial is intended to be inexpensive in manufacture and since it is desired that it be used in large quantities, the cost of each individual order dial may therefore be relatively low so that replacement will not be expensive; however, in Figures 12 and 13, I have indicated a type of construction for my order dial which will permit the ends thereof to be easily separated for the purpose of mounting additional rubber bands thereon. Thus, in Figure 12, notches 34—34 may be provided adjacent the outer periphery of the order dial and corresponding notches 35—35 may be provided adjacent the inner periphery thereof, each of said notches being likewise adjacent the gap 30 between the ends of the material forming the order dial. It will thus be clear that the insertion of a rubber band 36 into for instance the notches 35—35 and the engagement of such rubber band in the indented portions 37—37 will serve to bind the ends of the material forming the order dial together at 30, particularly where the rubber band in its unstretched condition is shorter than the distance between the corresponding edges of portions 37. Likewise, a similar rubber band may be mounted in the notches 34—34 to be engaged in the indentations 38—38 to serve exactly the same function of rubber band 36. Since the ends of the material forming the order dial are thus drawn tightly together at the gap 30 and since such order dial is intended to be a relatively thin piece of Celluloid, it may be possible that the ends of the material forming such order dial may slide over and overlap each other. Accordingly, in order to prevent this and avoid such eventuality, studs 39—39 (Fig. 13) of any suitable material may be provided at the ends of the material forming the order dial adjacent the gap 30, such studs being of such thickness as to minimize any possibility of one end of the material forming the order dial sliding over the other.

Figure 16:
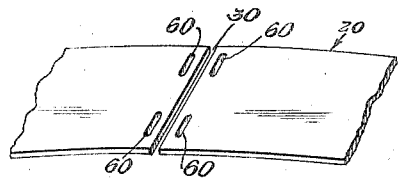
Figures 16, 17, 18 and 19 illustrate further modified means for fastening the ends of the material forming my order dial together.
Figure 17:
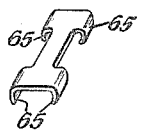
Figure 19:
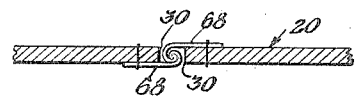
Figure 18:
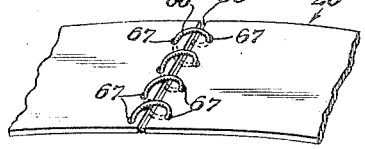

Although I have here shown the use of two rubber bands in order to bind the ends of the material forming the order dial together, obviously in appropriate situations, only one need be used. And, any other suitable means as for instance an inexpensive hooking arrangement may be used in order to bind the ends of the material forming the order dial together. A preferred inexpensive means for releasably binding the edges of the material forming the disk together at 30 is shown in Figure 16 wherein the ends of the material forming the main portion of the disk may have perforations or slots 60 therein and a malleable metallic slip 61 may be provided, the legs 62 of which may be inserted in corresponding perforations 60 at opposite sides of the gap 30, said legs being readily manually bendable against the disk material after insertion. Or a clip 64 (Figure 17) made also of manually bendable metal having legs 65 may be used to bind the edges of the blank together, the formation of such a clip precluding the necessity for a multiplicity of parts. Or as in Figure 18, a spirally arranged wire 66 may be threaded into perforations 67 at opposite sides of the gap 30. Or as in Figure 19, a simple inter-hooking arrangement comprising hooks 68, 68 may be used. Or various other releasable fastening or interengaging means may be used.

In each use, the purpose of such releasable binding at 30 is to permit the addition of rubber bands after the old ones have frayed or broken.

This may well be unnecessary since the device is intended to be relatively inexpensive and easily replaceable; and since the device may be furnished in the first instance with more rubber bands than may be necessary. The additional rubber bands serving as replacements. In the latter case, the blank space 32 may be notched or indented so that it is thinner than the remainder of the disk so that it may accommodate a large number of rubber bands. In the preferred form, the notches 25 (Fig. 1) should be rounded so that the rubber bands will not tend to be torn on sharp corners. In the form shown in Figure 12, the notches 34 and 35 on the indentations 37 and 38 may be larger in order that surplus rubber bands may be stored therein.

Such provision of a readily releasable means for binding the ends of the order dial together at the gap 30 is necessary only where extreme economy is desired, that is, where it is thought to be too expensive to furnish a new order dial when the rubber bands on the old one have become frayed or broken. In the usual case, a type of semi-permanent fastening such as that shown in Figure 1 and 11 will adequately serve the purpose.

It will thus be seen that in the operation and use of my device when the housewife or user of products sold or distributed by the milk delivery company desires to change the order or increase the order, or give any other instructions with relation to her order that may be needed, she need only take the order dial, move the indicators, that is the rubber bands, to the position desired and place the dial over a milk bottle, door knob, nail hook or other projecting member.

There is thus no necessity for writing a note, of any kind, no necessity for hunting pencil and paper; the various items dealt with by the company are brought to the attention of the housewife when she is making up the new or revised order, so that suggestions as to new items or additional quantities thereof are automatically made to her; and the whole process of making the order, changing the order, and of determining what items and what quantities thereof are to be ordered, are thoroughly simplified. In addition, the placement of the name of the customer as for instance at 41, of Figure 3, on the order dial serves further to increase the good will between the milk delivery company and the customer and serves to identify the customer where there are a plurality of customers in the same building. Any suitable provision may be made for the insertion of the name of the customer by the milk company in such a manner that the cleaning or weathering of the order dial would not tend to obliterate the name. The name of the milk company is also brought to her attention where, as in Figure 3, it is inscribed at 40 on the order dial itself, and serves to properly address the order where several companies deliver to the same apartment house.

Figure 5:
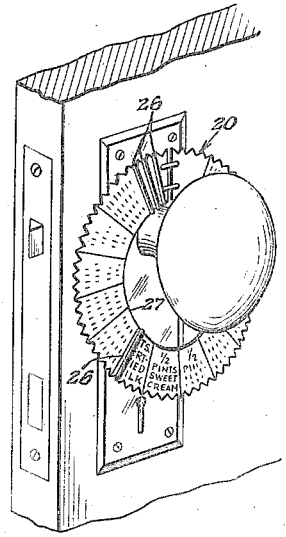
Figure 5 is a view in perspective showing my device in use in connection with a door knob.

The formation and construction of my order dial is such that it lends itself for use not only in connection with milk bottles or the products of milk delivery companies, but may be used to give information as to any type of article and in almost any type of transaction. Thus, for instance, where no empty milk bottle is available, or where in particular circumstances it is not desirable to use an empty bottle, the order dial may be slipped over a door knob as in Fig. 5 or it may be hung over a hook or nail or any other member so as to be visible to the party to whom the information is to be given. The dial may be so arranged, also, as to be useful for other purposes. Thus it may be used to indicate for instance, time of return to an office; and it may be used when properly arranged to indicate to other retail dealers in non-dairy products what items are desired. When used on a door knob, it does not interfere with the use of the knob or with opening or closing of the door or locking or unlocking of the door; nor does it have any parts which may be crushed, disrupted or destroyed.

Figure 6:
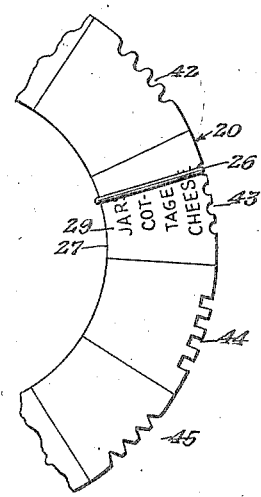
Figures 6, 7, 8, 9 and 10 show alternative arrangements of the notches or retaining means of my order dial.
Figure 8:
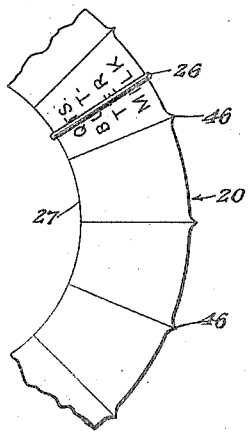
Figure 9:
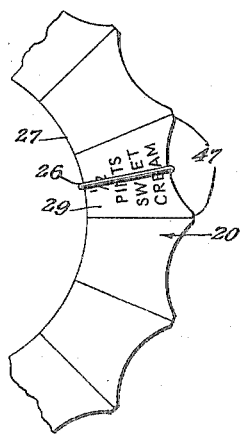

The notches 25 are provided in the outer periphery of the card simply for the purpose of insuring that the rubber bands will not be accidentally moved out of position after they have been placed at the desired point. It is obvious therefore that no particular conformation of notches is required but that means be provided on said order dial to retain the rubber bands in their predetermined position. Thus in Figure 6 I have shown at 42, 43, 44 and 45 various alternative arrangements of notches each of which may be useful in retaining the rubber bands in their predetermined position. Likewise, in Figures 8 and 9, I have shown at 46 and 47 other means for retaining the rubber bands in their predetermined position such means not being dependent upon individual notches for each individual rubber band but rather upon a single recess or retaining portion for each item which may be ordered.

Figure 7:
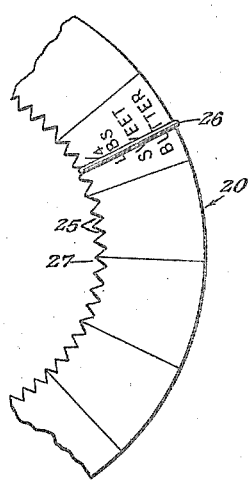
Figure 10:
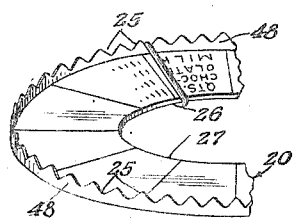

Likewise as seen in Figure 7, the notches 25 or any other suitable retaining means may be placed at the inner periphery of the order dial bounding the hole or perforation 21, leaving the outer periphery of the order dial smooth. The placement of the notches in this position provide the added function of retaining the indicator bands in place between the lips of the notches of the disk and the neck of the bottle. Also, if expense should not be an important item to be considered in the manufacture of said order dials, the order dial may have a conformation such as shown in Figure 10 where the notches are provided in a raised lip or rim 48 on the outer periphery of the order dial. Such raised lip or rim may of course be also placed on the inner periphery.

It is thus clear that many conformations of the order dial and particularly of the retaining means for the rubber bands may be used all within the spirit of my invention.

Although the materials of which my order dial may be made are numerous and varied, I prefer to make said order dial of a weather proof or weather resistant material preferably celluloid, so that it will withstand not only hard usage but also any weathering which might be met when said order dial is regularly placed at some point outside the house.

The order dial may be so formed that both the upper and under side are Celluloid so that the information imprinted on the order dial may be on a separate sheet between them or the information may be placed on a sheet which will adhere to the Celluloid on the under side thereof so that the information as to items and quantities desired will be visible through the Celluloid, the opposite side of the sheet carrying the suitable advertising matter as in Figure 3; the placement of the Celluloid as the upper lamination of the sheet providing in itself suitable protection against the elements.

In all cases, the order dial may be made of inexpensive materials, it may be sufficiently flexible to yield rather than be destroyed by torsional or disruptive forces, it may be easily cleaned or washed, it is sanitary in that no recesses are provided in which dirt may collect; and it may be constantly and repeatedly used to change or give directions with respect to the order. It is also easy to manufacture in that the blanks may be made by a simple tool or a single stroke of a die; no special tools are required to manufacture or assemble it. Since it is flat, it may be easily stored or shipped in quantity and since the same size may be used for varying purposes, there is no problem of storing or stocking different sizes or qualities.

It is also clear that other indicating means may be used in connection with the order dial which comprises my invention. Although I prefer the use of rubber bands which are the least expensive and most easily replaceable as well as the most convenient indicators, I may use other types of indicators, all within the spirit of my invention.

Figure 14:
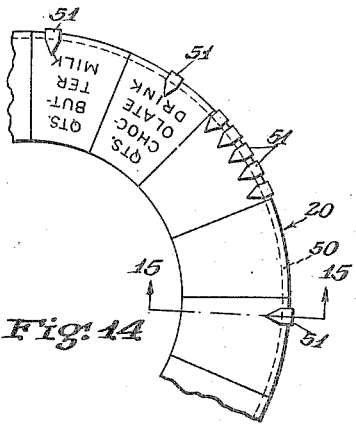
Figure 14 is a plan view showing an alternative form of indicating member for my ordering device.
Figure 15:
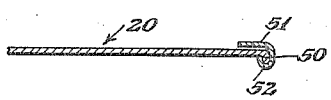
Figure 15 is a cross-sectional view on the line 15—15 of Figure 14.

Thus as in Figures 14 and 15, the order dial may have an outer lip 50 upon which slidable indicators 51 having reentrant portions 52 engaging the lip 50 may be mounted. Such slidable indicators may be moved to the position required to give the desired information as readily as the rubber bands, it being pointed out, however, that the use of rubber bands in this manner is nevertheless more convenient and more simple.

Where the device is to be used in connection with a milk bottle and particularly where such milk bottle may be placed in a box or other protective device, the order dial may be so formed that its outer periphery is no larger than the greatest diameter of the milk bottle at 24, Figure 4. Obviously, it is preferable to make the outer diameter order dial conform to the largest diameter of a quart size bottle since that is the bottle most commonly used and since such dimension provides greater space for various indicia. But such dimension and arrangement of the order dial does not preclude its use on a pint size bottle as shown in Figure 4. Even in such a case, where the outer diameter of the order dial is greater than that of the main portion of the bottle, the disk may be tilted or inclined on the neck of the bottle, particularly when the inner perforation is of a diameter greater than that of the neck of the bottle, so that the bottle with the order dial thereon may be inserted in a box or protective container.

The distinct advantage of my device over devices which have heretofore been proposed is that no writing whatever by the customer is required. The device is so formed that it is readily usable in connection with either a milk bottle, door knob or any other suitable retaining means. It is extremely inexpensive to manufacture and the indicating means used in connection therewith is simple to operate. It furnishes a need which has not been solved by any other device heretofore offered or made.

Having described my invention, I do not intend to be limited by the specific disclosure herein but rather by the appended claims.

What I claim is:

1. An order device comprising a disk, a perforation in said disk of a size adapting it for placement upon the neck of a milk bottle, a series of spaces for items on said disk, continuous bands mounted on said disk, each band encircling the material of said disk from the outer periphery thereof to the inner periphery defined by the perforation, said bands being manually movable to the desired space, and recesses on a periphery of said disk for releasably engaging said bands at a desired setting.

2. An order device comprising a disk, a perforation in said disk of a size adapting it for placement upon the neck of a milk bottle, a series of spaces for items on said disk, and continuous elastic bands mounted on said disk, each band encircling the material of said disk from the outer periphery thereof to the inner periphery defined by the perforation, each band being stretched when mounted on said disk, said bands being manually movable to the desired space.

3. An ordering device comprising a flat circular disk of weather-proof material, a perforation in said disk, means on said disk for mounting the same on a nodular member, a series of spaces for items on said disk, and continuous bands mounted on said disk, each band encircling the material of said disk from the outer periphery thereof to the inner periphery defined by the perforation, said bands being manually movable to the desired space.

4. An order device comprising a disk, a perforation in said disk, a series of spaces for items on said disk, and continuous bands mounted on said disk, each band encircling the material of said disk from the outer periphery thereof to the inner periphery defined by the perforation, said bands being manually movable to the desired space, and releasable means joining the ends of the material forming said disk to permit the mounting of additional bands thereon.

5. An ordering device comprising a flat circular disk, a circular hole in said disk, a plurality of notches on the inner periphery defining the hole of said disk, a plurality of elastic bands slidably mounted on said disk, and engageable by said notches, and indicia on the face of said disk.

6. An order device comprising a disk, a perforation in said disk, a series of spaces for items on said disk, continuous bands mounted on said disk, each band encircling the material of said disk from the outer periphery thereof to the inner periphery defined by the perforation, said bands being manually movable to the desired space, means on a periphery of said disk for releasably engaging said bands at a desired setting, and means on said disk for storing said bands in non-indicating position.

7. An order device comprising a disk, a perforation in said disk, a series of spaces for items on said disk, continuous bands mounted on said disk, each band encircling the material of said disk from the outer periphery thereof to the inner periphery defined by the perforation, said bands being manually movable to the desired space, means on a periphery of said disk for releasably engaging said bands at a desired setting, and a space on said disk for storing said bands in non-indicating position, the radial distance from the outer to the inner periphery of said space being less than that of the remainder of the disk.

8. An order device comprising a disk, a perforation in said disk, a series of spaces for items on said disk, and continuous bands mounted on said disk, each band encircling the material of said disk from the outer periphery thereof to the inner periphery defined by the perforation, said bands being manually movable to the desired space, and releasable means joining the material forming the ends of said disk to permit the mounting of additional bands thereon, said releasable means comprising a clip having manually bendable engaging means.

MARTIN B. BELINE.